United States Patent [19]

Martin

[11] Patent Number: 5,035,076
[45] Date of Patent: Jul. 30, 1991

[54] FISHING HOOK ASSEMBLY

[76] Inventor: Marcel Martin, P.O. Box 136, 7 Station Street, Green River, New Brunswick, Canada, E0L 1E0

[21] Appl. No.: 486,937

[22] Filed: Mar. 1, 1990

[51] Int. Cl.⁵ .............................................. A01K 83/00
[52] U.S. Cl. ................................................ 43/37; 43/36
[58] Field of Search ............................. 43/36, 37, 44.6

[56] References Cited

U.S. PATENT DOCUMENTS

| | | | |
|---|---|---|---|
| 2,124,378 | 7/1938 | Steger | 43/36 |
| 2,247,806 | 7/1941 | Foley | 43/37 |
| 2,257,403 | 9/1941 | Vandine | 43/44.6 |
| 2,357,357 | 9/1944 | Fremo | 43/36 |
| 2,403,202 | 7/1946 | Woodward | 43/37 |
| 2,506,137 | 5/1950 | Chenette | 43/36 |
| 2,722,078 | 11/1955 | Nikota | 43/36 |
| 2,810,230 | 10/1957 | Dawson | 43/37 |
| 2,856,722 | 10/1958 | Byhre | 43/36 |
| 3,013,357 | 12/1961 | Bujjoni | 43/37 |
| 4,726,142 | 2/1988 | Tapley | 43/36 |

FOREIGN PATENT DOCUMENTS

| | | |
|---|---|---|
| 99274 | 3/1902 | Canada . |
| 127437 | 10/1906 | Canada . |
| 341902 | 5/1934 | Canada . |
| 631130 | 11/1961 | Canada . |
| 645048 | 7/1962 | Canada . |
| 1045380 | 1/1979 | Canada . |
| 1238490 | 6/1988 | Canada . |
| 625588 | 12/1926 | France . |
| 67473 | 12/1927 | Sweden . |

*Primary Examiner*—Richard K. Seidel
*Assistant Examiner*—Chuck Y. Mah
*Attorney, Agent, or Firm*—Ridout & Maybee

[57] ABSTRACT

In a fishing hook assembly of the type in which, in a first set condition, limbs of the assembly presenting hooks are restrained by a latch member which when actuated by a fish striking the assembly permits the limbs to move under the influence of resilient urging thereof to a second released condition in which the fish is snared by the hooks the actuation of the latch member is a pivotal movement thereof about an intermediate axis with the trigger of the latch member being moved towards the plane of movement of the hooks.

12 Claims, 4 Drawing Sheets

FISHING HOOK ASSEMBLY

This invention relates to a fishing hook assembly which is operatively attached either directly or indirectly through, for example, a swivel which may be of conventional form to the end of a fishing line, the fishing hook assembly being of a type previously known in the art in which the fishing hook assembly is actuated by a fish striking the assembly from an initial first set condition to a second released condition in which the fishing hook assembly operatively snares the fish.

Examples of this type of fishing hook assembly are those disclosed in U.S. Pat. Nos. 2,722,078 to Nikota, 2,506,137 to Chenette and 4,726,142 to Tapley. The above patent to Nikota discloses a form of fishing hook assembly in which, with the assembly in the first set condition thereof shown in FIGS. 3, 4 and 5, the portions 3 and 3a are not in intersecting relationship and the seat 7 of the trigger member 5 engages the hooks 4 and 4a to retain the assembly in this first set condition. When a fish strikes the assembly the trigger member 5 is urged in a direction substantially perpendicular to, and towards, the plane of the portions 3 and 3a, thereby resulting in the release of the hooks 4 and 4a which are resiliently urged towards the second released condition shown in FIG. 1 in which the portions 3 and 3a are in intersecting relationship. The above patent to Chenette discloses a form of fishing hook assembly in which, on the other hand, the shanks 32 and 33 are, in the first set condition, in intersecting relationship and are resiliently urged out of this intersecting relationship when the assembly attains the second released condition. However, in this form of fishing hook assembly disclosed by Chenette the operation of the trigger or latch bar 37 is caused by the pull of the fish on the assembly. In the form of fishing hook assembly disclosed in the above patent to Tapley the legs 4 and 5 are again in intersecting relationship when the assembly is in the first set condition and are resiliently urged out of this intersecting relationship as the assembly attains its second released condition. In this form of fishing hook assembly disclosed by Tapley, however, the trigger arm 11, actuation of which releases the legs 4 and 5 to permit these legs 4 and 5 resiliently to move to the second released condition, is in a plane substantial coincident with the plane of the legs 4 and 5 and the respective hook portions 6 and 7.

The present invention provides a fishing hook assembly which incorporates features corresponding to some of the features of the above-described fishing hook assemblies disclosed in the patents to Nikota, Chenette and Tapley, but in which the structure and operation of the fishing hook assembly differs from the structure and operation of the above-described previously known forms of fishing hook assemblies.

In accordance with the present invention there is provided a fishing hook assembly comprising first and second limbs each of which has one end and an opposed end, with said one ends of the limbs being interconnected and said opposed ends of the limbs each presenting a reflexly curved hook having a pointed extremity. The limbs are resiliently urged from a first set condition in which the hooks are adjacent to each other towards a second released condition in which the hooks are spread apart with the pointed extremity of each hook on an outer side of the hook assembly, with movement of the hooks as the limbs move between the first set condition and the second set condition thereof being in a plane. A releasable latch member is coupled to the first limb and is releasably engageable with the second limb, thereby to restrain the limbs in the first set condition thereof, the latch member comprising a trigger at the end of the latch member adjacent to the hooks, with the trigger being movable, by pivotable movement of the latch member about an intermediate pivot axis, towards said plane of movement of the hooks as the limbs move between the first section condition and the second released condition thereof, thereby to release the engagement of the latch member with the second limb and so permit movement of the limbs from the first set condition towards the second released condition under the influence of the resilient urging thereof.

In order that the invention may be more clearly understood and more readily carried into effect the same will now, by way of example, be more fully described with reference to the accompanying drawings in which FIG. 1 is a top plan view of a fishing hook assembly according to a first preferred embodiment of the invention, the assembly being shown in a first set condition thereof;

Figure 1:
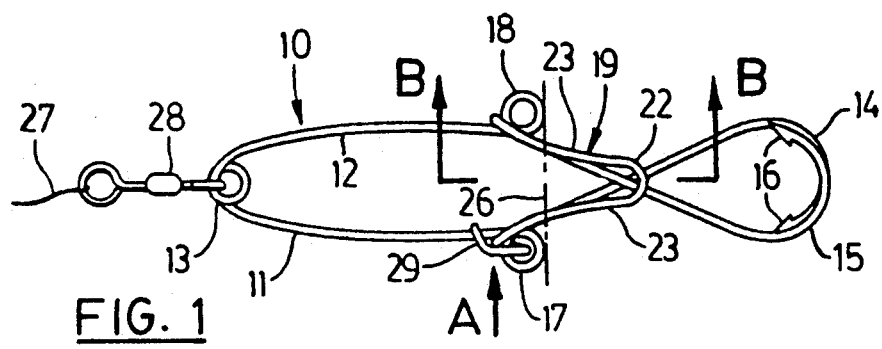

Referring to the drawings and in particular to the first preferred embodiment shown in FIGS. 1 to 4, inclusive, the fishing hook assembly illustrated therein comprises a wire member 10 which is formed into a first limb 11 and a second limb 12, each of which has one end with said one ends of the limbs 11 and 12 being interconnected at 13. It will be noted that in the preferred embodiments of the invention described herein with reference to the accompanying drawings the interconnection 13 of said one ends of the limbs 11 and 12 comprises a closed loop formed in the wire member 10. The limbs 11 and 12 also have opposed ends remote from said one ends thereof and which present reflexly curved hooks 14 and 15, respectively, these hooks 14 and 15 constituting continuations of the wire member 10. The extremity 16 of each hook 14 and 15 is of pointed, and preferably barbed, form.

Each limb 11 and 12 is formed intermediate its length with a closed loop 17 and 18, respectively, and a releasable latch member 19 which comprises a wire member separate from the wire member 10 is coupled to the limb 11 and is releasably engageable with the limb 12. In the preferred embodiments described herein with reference to the accompanying drawings one end portion of the latch member 19 is formed with a closed loop 20 which is interlinked with the loop 17 presented by the limb 11 to provide said coupling of the latch member 19 to the limb 11, the other end portion of the latch member 19 being bent to form a depending engagement tooth 21 (see FIG. 3) which, with the limbs 11 and 12 in a first set condition, shown in FIG. 1, is releasably engaged with the loop 18 on an outer side of the hook assembly thereby to restrain the limbs 11 and 12 in this first set condition thereof. As will be appreciated, the loop 18 thus constitutes a projection with which the tooth 21 is releasably engageable on the outer side of the limb 12.

Figure 2:
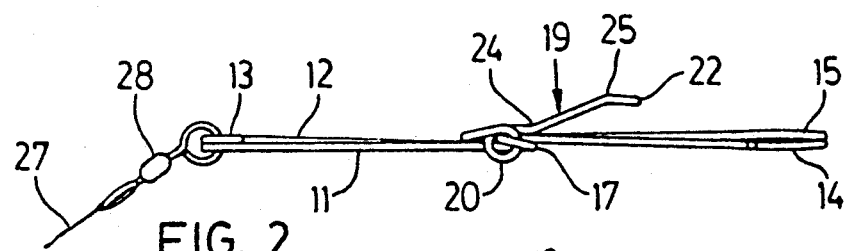
FIG. 2 is a side view of the assembly in the direction of the arrow A in FIG. 1.
Figure 3:
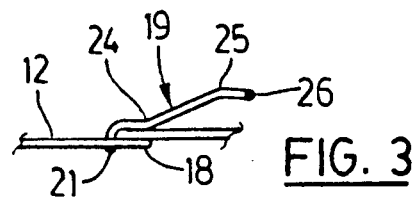
FIG. 3 is a sectioned view on the line B—B in FIG. 1.
Figure 4:
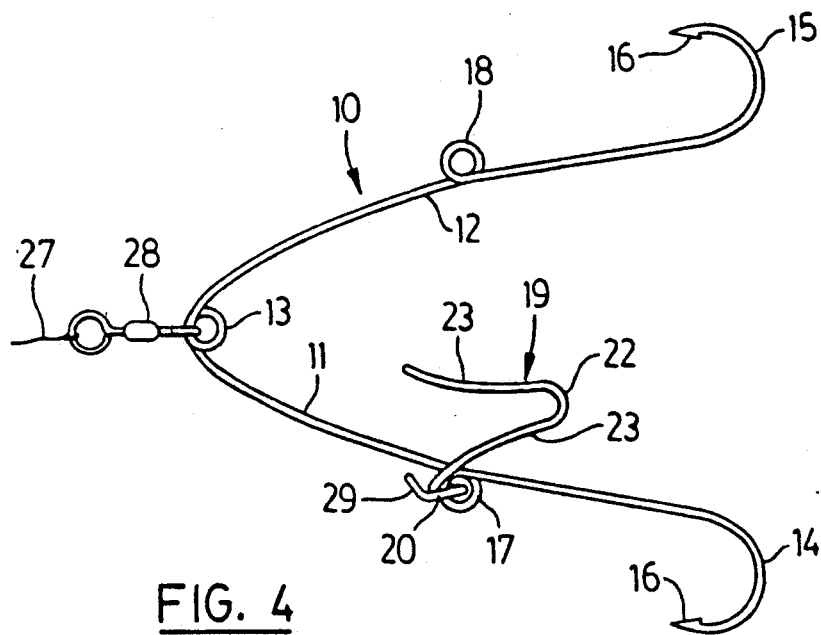
FIG. 4 is a view corresponding to FIG. 1 but with the assembly shown in a second released condition thereof.

The latch member 19 is formed with a bight 22 which constitutes a trigger and from which there extends two legs 23, these legs 23 being bent as indicated by the reference numeral 24 in FIG. 2, and the legs 23 preferably being further bent as indicated by the reference numeral 25 in FIG. 2 substantially at the location of the junctions of the bight 22 with the legs 23. As is hereinafter more fully explained the bends 24 constitute an intermediate pivot axis 26 of the latch member 19 relative to the limbs 11 and 12.

In operation, a fishing line 27 is attached either directly, or preferably indirectly through a swivel 28 which may be of conventional form to the loop 13, and the tooth 21 of the latch member 19 is, as hereinbefore described, releasably engaged with the projection 18 on the outer side of the limb 12 to restrain the limbs 11 and 12 in the first set condition shown in FIG. 1 in which the limbs 11 and 12 are in intersecting relationship and the hooks 14 and 15 are in adjacent and preferably overlapping relationship. It will be noted that in this first set condition the bight 22 of the latch member 19 is above a plane of movement of the hooks 14 and 15 as the limbs 11 and 12 move between the first set condition and a second released condition shown in FIG. 4. An angularly bent stop member 29 abuts the limb 11 to prevent movement of the bight 22 of the latch member 19 in the direction away from this plane beyond the position shown in FIG. 2.

When a fish operatively strikes the fishing hook assembly the fish takes into its mouth the hooks 14 and 15 and in closing its mouth the fish urges the bight 22 which is at the end of the latch member 19 adjacent to the hooks 14 and 15 in a direction substantially perpendicular to and towards the above-mentioned plane, this movement of the bight 22 of the latch member 19 causing the latch member 19 to pivot about the pivot axis 26 at which the bends 24 in the legs 23 of the latch member 19 are in bearing contact with the adjacent portions of the respective limbs 11 and 12. This pivotal movement of the latch member 19 is permitted by the loose interlinking of the loops 17 and 20 and results in the end portions of the legs 23 remote from the bight 22 being moved away from the above-mentioned plane so that the tooth 21 is thereby disengaged from the projection 18 on the outer side of the limb 12. With this disengagement of the tooth 21, the limbs 11 and 12 are permitted relatively to move to the second released condition shown in FIG. 4 in which the limbs 11 and 12 are no longer in intersecting relationship, and as the limbs 11 and 12 move to this second released condition the hooks 14 and 15 spread apart with the pointed extremities 16 of the hooks 14 and 15 on the outer sides of the hook assembly and snare the fish by engaging in the sides of the mouth of the fish, the limbs 11 and 12 being resiliently urged from the first set condition towards the second released condition. The engagement of the hooks 14 and 15 in the sides of the mouth of the fish as opposed to the roof and bottom of the mouth of the fish result in reduced pain to the fish and facilitate disengagement of the fishing hook assembly from the fish without serious injury to the fish where it is desired to return the fish live to the water.

Figure 5:
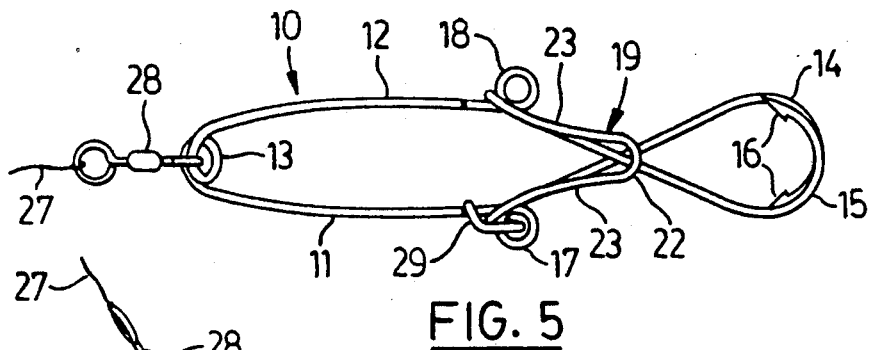
FIG. 5 is a view corresponding to FIG. 1 of a fishing hook assembly according to a second preferred embodiment of the invention.
Figure 6:
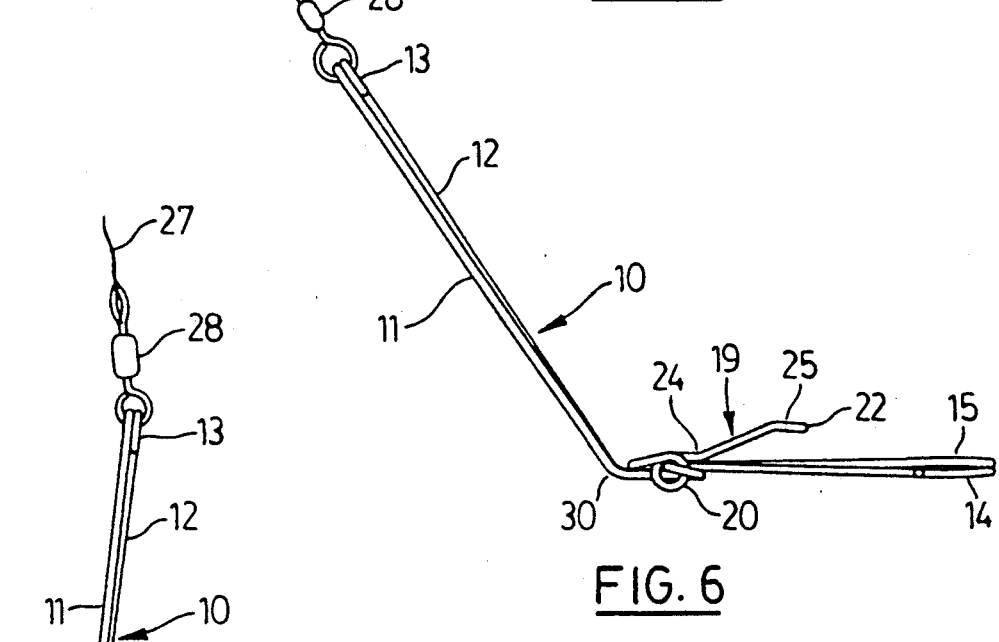
FIG. 6 is a side view corresponding to FIG. 2 of the assembly shown in FIG. 5.
Figure 7:
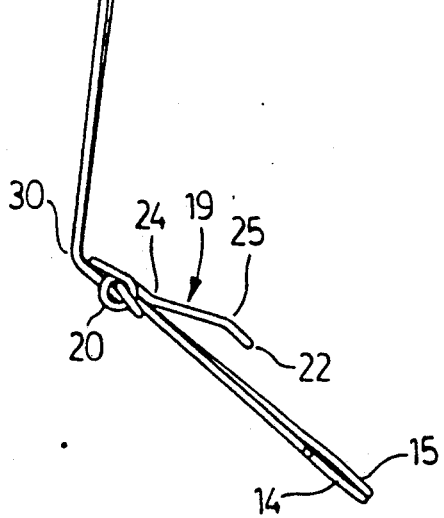
FIG. 7 is a side view corresponding to FIG. 6 but showing the fishing hook assembly substantially in its operative fishing orientation.

Except as described below the second preferred embodiment of the fishing hook assembly as shown in FIGS. 5 to 7, inclusive, corresponds in structure and operation to the first preferred embodiment as described above with reference to FIG. 1 to 4, inclusive, and the same reference numerals are used to denote corresponding parts. In the second preferred embodiment of FIGS. 5 to 7, inclusive, the limbs 11 and 12 are bent at the locations 30 so that the portions of the limbs 11 and 12 between these bends 30 and the ends of the limbs 11 and 12 at the loop 13 are disposed in a plane which is at an acute angle of preferably about 50°-60° to the plane containing the remaining portions of the limbs 11 and 12. This second preferred embodiment of the invention is particularly suitable for ice or float fishing since, as shown in FIG. 7, the fishing hook assembly, when in use, is in an orientation in which said remaining portions of the limbs 11 and 12 and the hooks 14 and 15 are inclined at an angle which is a natural feeding angle for the fish, such as cod.

Figure 8:
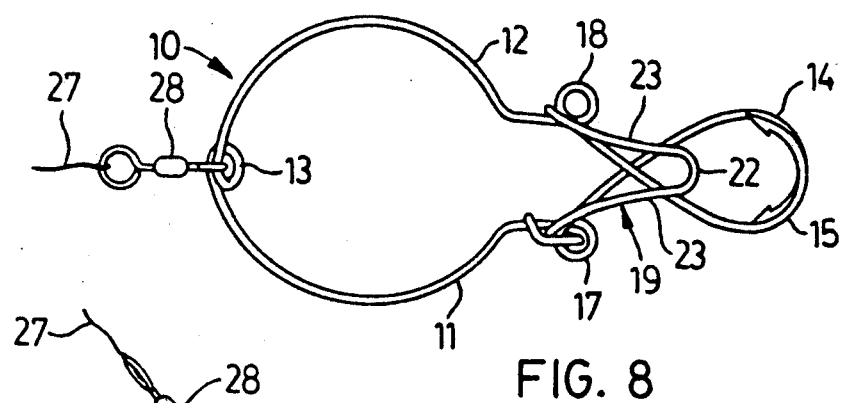
FIG. 8 is a view corresponding to FIG. 1 of a fishing hook assembly according to a third preferred embodiment of the invention.
Figure 9:
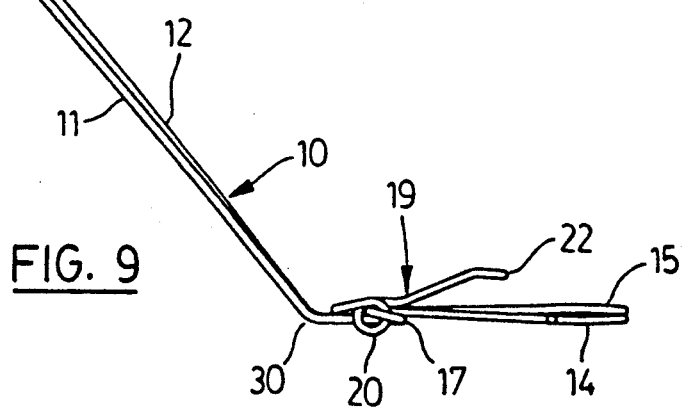
FIG. 9 is a side view corresponding to FIG. 2 of the assembly shown in FIG. 8.
Figure 10:
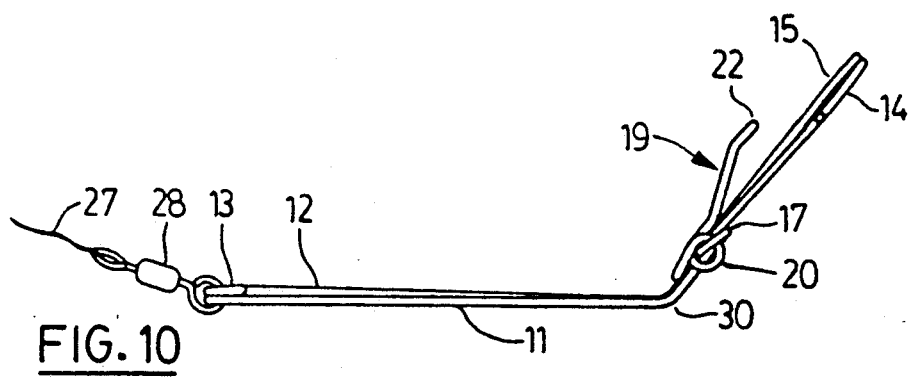
FIG. 10 is a side view corresponding to FIG. 9 but showing the fishing hook assembly substantially in its operative fishing orientation.

The third preferred embodiment of the fishing hook assembly shown in FIGS. 8 to 10, inclusive, again corresponds in structure and operation to the first preferred embodiment hereinbefore described with reference to FIGS. 1 to 4, inclusive, but again the limbs 11 and 12 are provided with the bends 30, and in addition the portions of the limbs 11 and 12 between these bends 30 and the ends of the limbs 11 and 12 at the loop 13 are outwardly curved as shown in FIG. 8. This facilities use of the fishing hook assembly according to this third embodiment as a bottom fishing hook assembly in which, as shown in FIG. 10, the portions of the limbs 11 and 12 between the bends 30 and the ends of the limbs 11 and 12 at the loop 13 are dragged along the bottom of the lake or the like being fished with the remaining portions of the limbs 11 and 12 and the associated hooks 14 and 15 being inclined upwardly.

Figure 11:
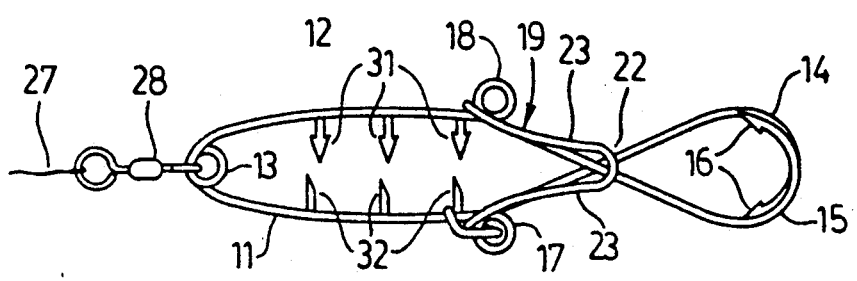
FIG. 11 is a view corresponding to FIG. 1 of a fishing hook assembly according to a fourth preferred embodiment of the invention.

The fourth preferred embodiment of the fishing hook assembly shown in FIG. 11 corresponds in structure and operation to the first preferred embodiment hereinbefore described with reference to FIGS. 1 to 4, inclusive, except that one of the limbs 11 and 12 presents an inwardly directed prong or prongs 31 which preferably have barbed extremities, so that a live bait such as a minnow can be attached, between the limbs 11 and 12, to these prongs 31. A further inwardly directed prong or prongs 32 can also be presented by the other of the limbs 11 and 12, although these further prongs 32 are unbarbed so that when the fishing hook assembly moves from its first set condition to its second released condition the bait readily slides off the prongs 32 but remains attached to the barbed prongs 31.

Figure 13:
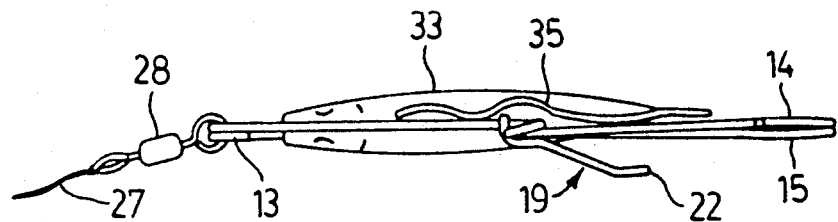
FIG. 13 is a side view in the direction of the arrow C in FIG. 12.
Figure 12:
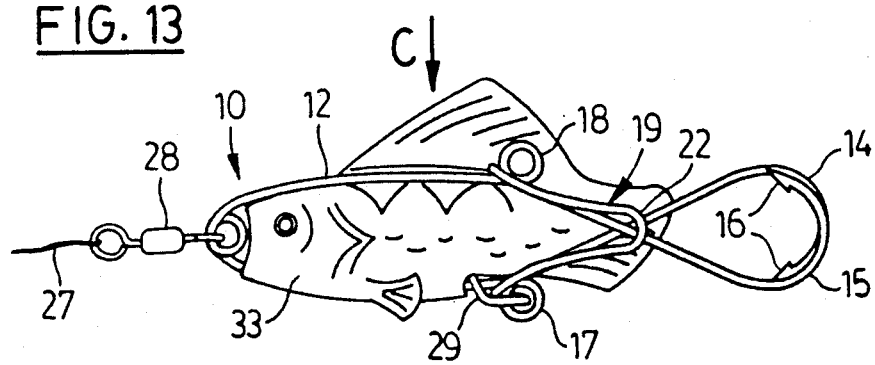
FIG. 12 is a view corresponding to FIG. 1 of a fishing hook assembly according to a fifth preferred embodiment of the invention.
Figure 14:
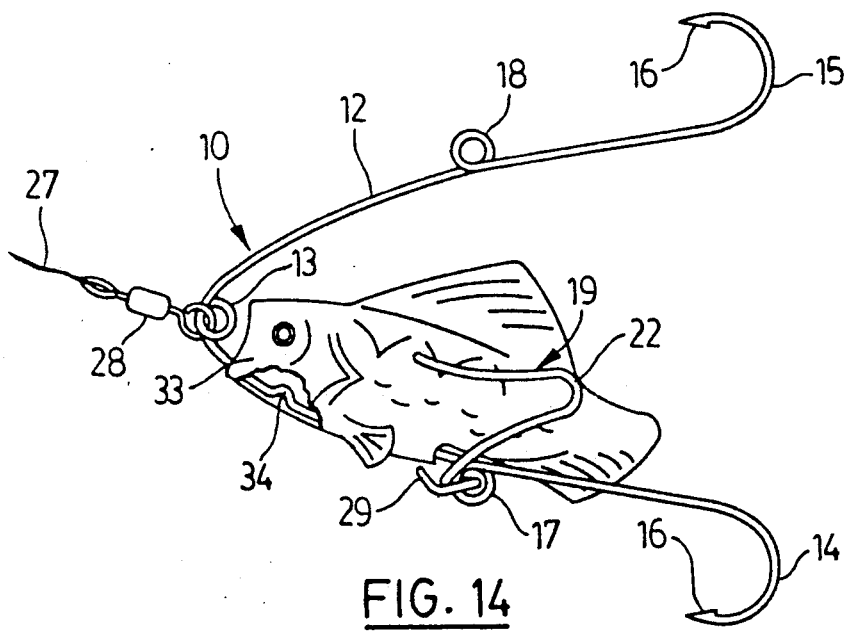
FIG. 14 is a view corresponding to FIG. 12 but with the hook assembly shown in a second released condition thereof.

Finally, the fifth preferred embodiment of the fishing hook assembly shown in FIGS. 12 to 14, inclusive, again corresponds in structure and operation to the first preferred embodiment hereinbefore described with reference to FIGS. 1 to 4, inclusive, but in the case of this fifth preferred embodiment an artificial bait 33 is attached to one of the limbs 11 and 12, such as the limb 11, with the bait 33 projecting inwardly of this limb 11, this attachment of the bait 33 to the limb 11 preferably including the provision in the portion of the limb 11 to which the bait 33 is attached of one or more indentations 34. Furthermore, a fin 35 of the artificial bait 33 is preferably of wavy configuration as shown in FIG. 13 so that as the fishing hook assembly of this fifth preferred embodiment of the invention is trolled through the water the wavy configuration of the fin 35 causes lateral oscillation of the assembly.

I claim:

1. A fishing hook assembly comprising first and second limbs each of which has one end and an opposed end, with said one ends of the limbs being interconnected, and said opposed ends of the limbs each presenting a reflexly curved hook having a pointed extremity, the limbs being resiliently urged from a first set condition in which the hooks are adjacent to each other towards a second released condition in which the hooks are spread apart with the pointed extremity of each hook on an outer side of the hook assembly, with movement of the hooks as the limbs move between the first set condition and the second released condition thereof being in a plane, and a releasably latch member which is coupled to the first limb and is releasably engageable with the second limb thereby to restrain the limbs in the first set condition thereof, the latch member comprising a trigger at the end of the latch member adjacent to the hooks, with the trigger being movable, by pivotal movement of the latch member about an intermediate pivot axis towards said plane of movement of the hooks as the limbs move between the first set condition and the second released condition thereof, thereby to release the engagement of the latch member with the second limb and so permit movement of the limbs from the first set condition towards the second released condition under the influence of the resilient urging thereof.

2. A fishing hook assembly according to claim 1, wherein the limbs are in intersecting relationship with the hooks overlapping when the limbs are in the first set condition thereof, the limbs when moved under the influence of the resilient urging thereof towards the second released condition being moved out of intersecting relationship with the hooks being moved out of overlapping relationship.

3. A fishing hook assembly according to claim 2, wherein the latch member comprises a bight which constitutes the trigger and two legs, one of which has an end portion remote from the bight and which is loosely coupled to the first limb to provide said coupling of the latch member to the first limb, and the other of which has an end portion remote from the bight and which constitutes an engagement tooth, the second limb having a projection on an outer side of the hook assembly with the tooth of the latch member being releasably engageable with the projection to provide said releasable engagement of the latch member with the second limb thereby to restrain the limbs in the first set condition thereof, and the intermediate pivot axis comprising bearing contact of the legs of the latch member with the respective limbs at positions intermediate the bight and the end portions of the legs of the latch member.

4. A fishing hook assembly according to claim 3, wherein the end portion of said one of the legs of the latch member has a stop member which, with the limbs in the first set condition thereof and the tooth in releasable engagement with the second limb, abuts the first limb to limit movement of the trigger away from said plane of movement of the hooks as the limbs move between the first set condition and the second released condition thereof.

5. A fishing hook assembly according to claim 1, wherein at positions between said one ends of the limbs and said coupling of the latch member to the first limb and said releaseable engagement of the latch member with the second limb the limbs are provided with bends, with the portions of the limbs between said bends and said one ends of the limbs being in a plane at an acute angle to a plane containing the remaining portions of the limbs.

6. A fishing hook assembly according to claim 5, wherein the acute angle between the plane of the portions of the limbs between said bends therein and said one ends of the limbs and the plane of the remaining portions of the limbs is approximately 50°–60°.

7. A fishing hook assembly according to claim 5, wherein said portions of the limbs between said bends therein and said one ends of the limbs are outwardly curved.

8. A fishing hook assembly according to claim 7, wherein the acute angle between the plane of the portions of the limbs between said bends therein and said one ends of the limbs and the plane of the remaining portions of the limbs is approximately 50°–60°.

9. A fishing hook assembly according to claim 1, wherein one of the first and second limbs presents at least one inwardly directed prong.

10. A fishing hook assembly according to claim 9, wherein said at least one inwardly directed prong has a barbed extremity.

11. A fishing hook assembly according to claim 10, wherein the other of the first and second limbs presents at least one inwardly directed prong without a barbed extremity.

12. A fishing hook assembly according to claim 1, wherein artificial bait is attached to one of the first and second limbs with the bait projecting inwardly of said one of the limbs.

* * * * *